United States Patent
Wang

(10) Patent No.: US 8,858,212 B2
(45) Date of Patent: Oct. 14, 2014

(54) DOUBLE COLOR INJECTION MACHINE WITH SHAFT AND DISC

(75) Inventor: Jui-Hsiang Wang, Tainan (TW)

(73) Assignee: Hwa Chin Machinery Factory Co., Ltd., Tainan (TW)

( * ) Notice: Subject to any disclaimer, the term of this patent is extended or adjusted under 35 U.S.C. 154(b) by 95 days.

(21) Appl. No.: 13/554,424

(22) Filed: Jul. 20, 2012

(65) Prior Publication Data
US 2014/0023742 A1    Jan. 23, 2014

(51) Int. Cl.
B29C 45/06 (2006.01)
B29C 45/13 (2006.01)

(52) U.S. Cl.
USPC ........................................ 425/348 R; 425/576

(58) Field of Classification Search
USPC ...... 425/259, 261, 348 R, 574, 575, 576, 588
See application file for complete search history.

(56) References Cited

U.S. PATENT DOCUMENTS

| | | | | |
|---|---|---|---|---|
| 3,063,108 A * | 11/1962 | Gardner | ........................ | 164/265 |
| 4,370,124 A * | 1/1983 | Buja | .............................. | 425/556 |
| 6,379,139 B1 * | 4/2002 | Boucherie | ................... | 425/129.1 |
| 6,402,504 B1 * | 6/2002 | Hahn et al. | ..................... | 425/574 |
| 6,468,458 B1 * | 10/2002 | Anderson et al. | ............. | 264/246 |
| 6,616,441 B1 * | 9/2003 | Zakich | ........................... | 425/574 |
| 6,638,047 B2 * | 10/2003 | Asai et al. | ...................... | 425/127 |
| 6,923,633 B2 * | 8/2005 | Rudolph et al. | ............... | 425/130 |
| 7,048,533 B2 * | 5/2006 | Ils et al. | ......................... | 425/576 |
| 7,108,498 B2 * | 9/2006 | Lai | ................................. | 425/190 |
| 7,393,196 B2 * | 7/2008 | Kunimatsu | ..................... | 425/135 |
| 7,431,578 B2 * | 10/2008 | Kunimatsu et al. | ........... | 425/135 |
| 7,455,516 B2 * | 11/2008 | Glashagen et al. | ........... | 425/572 |
| 7,537,442 B2 * | 5/2009 | Rahnhofer | ..................... | 425/190 |
| 8,066,507 B2 * | 11/2011 | Suzumura | ...................... | 425/576 |
| 8,616,876 B2 * | 12/2013 | Moulin | ........................ | 425/574 |
| 2002/0089088 A1 * | 7/2002 | Ils et al. | ......................... | 264/293 |
| 2004/0076701 A1 * | 4/2004 | Lai | ................................ | 425/130 |
| 2008/0050464 A1 * | 2/2008 | Dantlgraber | .................. | 425/556 |

FOREIGN PATENT DOCUMENTS

TW    M337467 U    8/2008

* cited by examiner

*Primary Examiner* — Yogendra Gupta
*Assistant Examiner* — Emmanuel S Luk
(74) *Attorney, Agent, or Firm* — Rosenberg, Klein & Lee

(57) ABSTRACT

A double color injection machine with a shaft and a disc is revealed. The double color injection machine includes a main body with a shaft and a disc. The disc is arranged with a slotted hole while the main body is disposed with an axial hole for being assembled with a shaft sleeve. The shaft sleeve is inserted through the axial hole to be mounted to the slotted hole of the disc. A first bearing is mounted in the slotted hole and is corresponding to the shaft sleeve. A servo motor is used to drive the shaft to rotate. Thereby by the shaft sleeve on the shaft corresponding to the first bearing of the disc, the shaft is not rotated with the rotation of the disc. When the servomotor drives the shaft to rotate, the disc is not rotated. At the same time, fast and precise positioning is attained.

4 Claims, 4 Drawing Sheets

DOUBLE COLOR INJECTION MACHINE
WITH SHAFT AND DISC

BACKGROUND OF THE INVENTION

1. Field of the Invention

The present invention relates to a double color injection machine with a shaft and a disc, especially to a double color injection machine that provides fast and precise positioning without affecting respective rotation of the shaft and the disc. By the design of the shaft sleeve on the shaft corresponding to the first bearing of the disc, friction and wear are minimized, manufacturing cost is reduce and assembly efficiency is improved.

2. Description of Related Art

Generally, double color injection molding means to produce products with two colors on the appearance or with double materials by using two colors of plastic or two kinds of materials. As to a double color injection molding machine, it is disposed with two sets of molds. A female die of the mold is connected to two material feeding units movably and respectively. A male die of the mold is fixed on two opposite surfaces of a mold plate that moves from an initial orientation to the opposite (at 180 degrees) and then rotates back to the original position. The male die and the female die are joined, then material is feeding and the mold is opened. Next the mold plate is rotated 180 degrees and turned to the opposite so as to change the position of the male die. The male die and the female die are joined again and material is feeding the second time. Then open and release the mold to get double-color or double-material products. The double color molding machine is divided into different designs according to basic design and molding products. The rotatable mold template includes two designs, one is with a shaft (shaft-type) and the other is with a disc (disc-type).

The disc-type double color injection molding machine uses motor to rotate the disc and change the positions of the two sets of molds. The positioning is achieved by a positioning pin and a positioning slot on molds. However, such positioning way has a shortcoming. After long term use, the positioning pin has wear or the positioning slot is enlarged. This leads to imprecise positioning.

Refer to U.S. Pat. No. 8,066,507, a horizontal injection molding machine includes a rotary plate that includes a rotary shaft extending in a horizontal direction and can be mounted with a plurality of molds and a stationary base that includes a bearing supporting the rotary shaft of the rotary plate in a cantilever manner and a rotary drive device of the rotary plate. The horizontal injection molding machine features on that the rotary plate is formed into a disk shape and is supported by the stationary base. The stationary base is disposed with a power source to position the rotary backwards. A disc spring in the rotary plate is used for buffering. However, such positioning is not precise.

Moreover, in the shaft-type double color injection molding machine, a gearing around a shaft is driven by a rack so as to turn a mold fixed on the shaft to the opposite. The positioning way is achieved according to the teeth of the gearing engaged with the rack. However, a gear backlash causes problems between the mating components. Thus the positioning is also not precise.

In order to overcome shortcomings of the shaft-type or disc-type injection molding machines, an integrated type machine has been developed. Refer to Taiwanese Pub. No. M337467, a disc-type injection molding machine that is able to be mounted with a shaft is revealed. A shaft can be assembled on or removed from the injection molding machine. The disc-type injection molding machine includes a main body with a base wall, a tube unit, a disc, a disc drive mechanism, and a shaft drive mechanism. The base wall is disposed with a mounting hole. The tube unit consists of a disc mounting tube that is rotatably assembled on the mounting hole, a shaft mounting tube that is rotatably mounted in a first shaft channel of the disc mounting tube and a shaft driving rod that is reciprocally moved in a working direction and is inserted through a second shaft channel of the disc mounting tube. The shaft is connected to and moved with the shaft driving rod. The disc is linked to and assembled on the disc mounting tube. The disc drive mechanism is installed on the man body and used to drive the disc rotate a certain angle. The shaft drive mechanism is also disposed on the main body and used to drive the shaft driving rod to move reciprocally in a working direction and rotate a certain angle. In a turning cylinder of the shaft drive mechanism, the shaft is driven and rotated by a rack. The design also has the gear backlash problem. Moreover, the shaft and the disc are rotated relatively by means of the shaft mounting tube, the disc mounting tube and bearings. The structure is quite complicated. Thus the cost is increased and the assembly is time-consuming.

SUMMARY OF THE INVENTION

Therefore it is a primary object of the present invention to provide a double color injection machine with a shaft and a disc that provides fast and precise positioning, minimizes friction and wear, reduces manufacturing cost and improve assembly efficiency.

In order to achieve the above objects, a double color injection machine with a shaft and a disc of the present invention includes a main body disposed with a disc and a shaft. The disc is arranged with a slotted hole while the main body is disposed with an axial hole that is assembled with a shaft sleeve. The shaft sleeve is passed through the axial hole to be mounted in the slotted hole of the disc. A first bearing corresponding to the shaft sleeve is mounted in the slotted hole. A servo motor is used to drive the shaft to rotate. Thereby by the design of the shaft sleeve on the shaft corresponding to the first bearing of the disc, the shaft is not rotated when the disc is driven to rotate. When the servo motor drives the shaft to rotate, the disc is not rotated. At the same time, fast and precise positioning is provided.

A base is connected to a rear end of the main body. A drive mechanism is mounted on the base and is connected to the shaft so as to drive the shaft to move horizontally.

A toothed part is disposed on one end of the shaft sleeve. By a driving belt, a driving wheel of the servo motor is linked to the toothed part so as to make the shaft sleeve rotate with the shaft.

A second bearing is arranged at a front end and on a rear end of the axial hole of the main body respectively for assisting in rotary action.

The servo motor of the double color injection machine with a shaft and a disc is further disposed with an encoder for more precise positioning.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
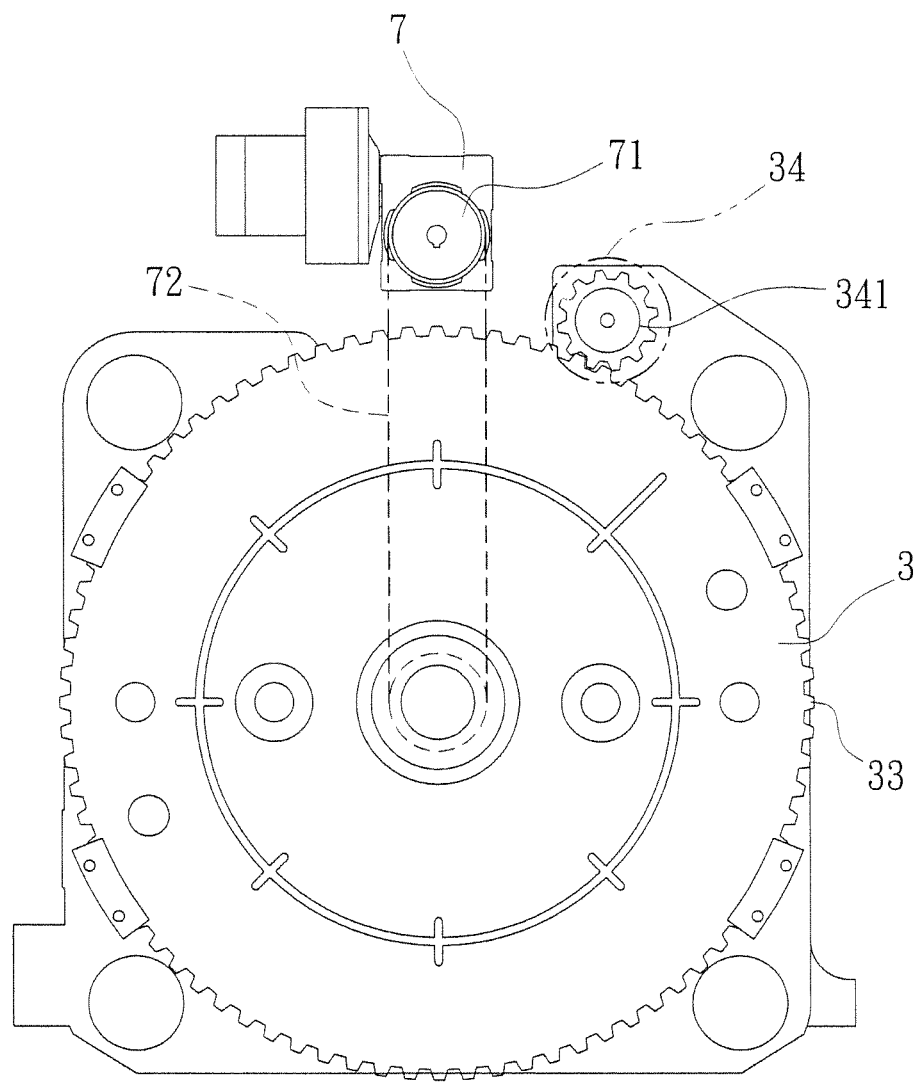
FIG. 1 is a schematic drawing showing a front view of an embodiment of a double color injection machine according to the present invention.
Figure 2:
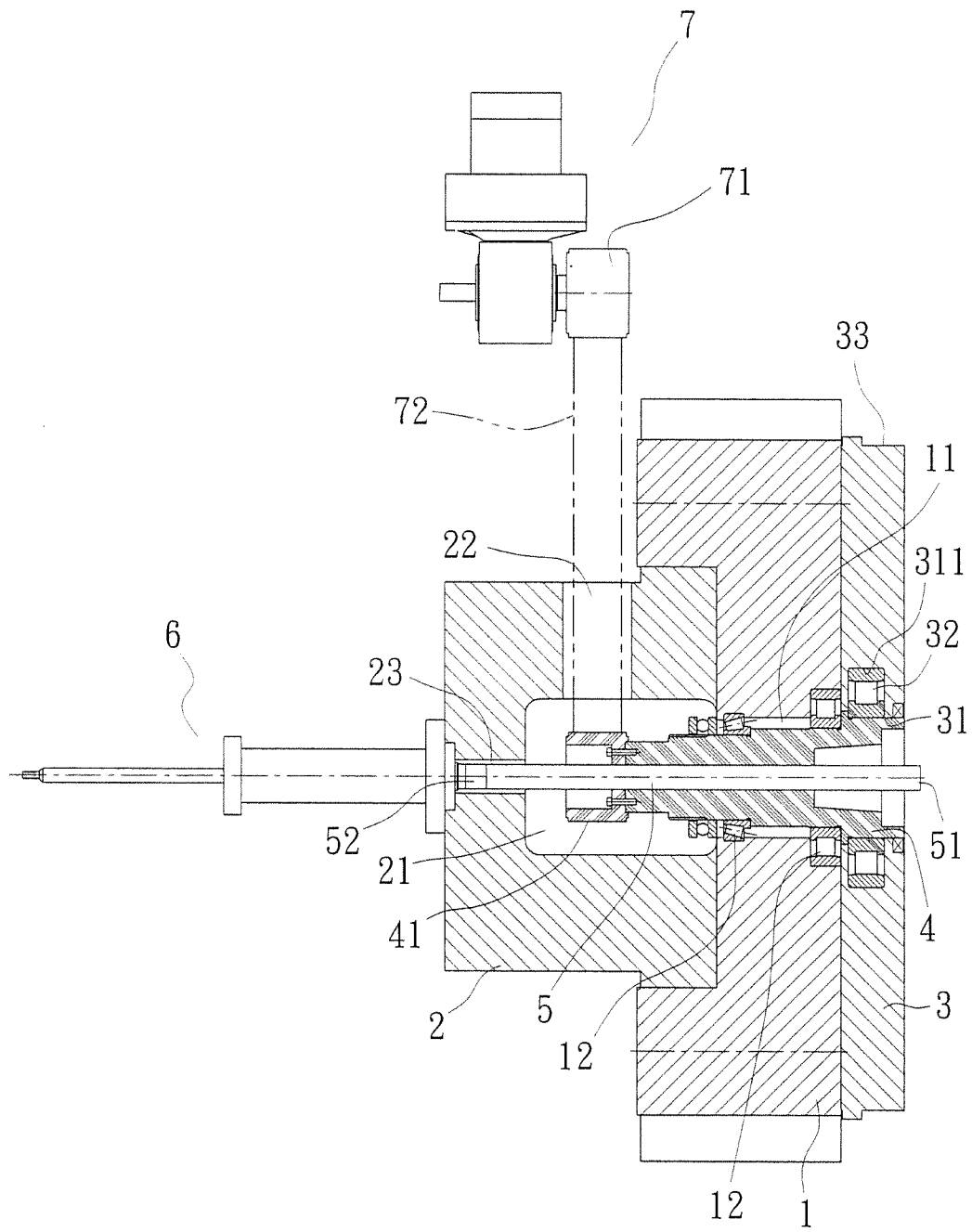
FIG. 2 is a schematic drawing showing a cross section of an assembled embodiment of a double color injection machine according to the present invention.
Figure 3:
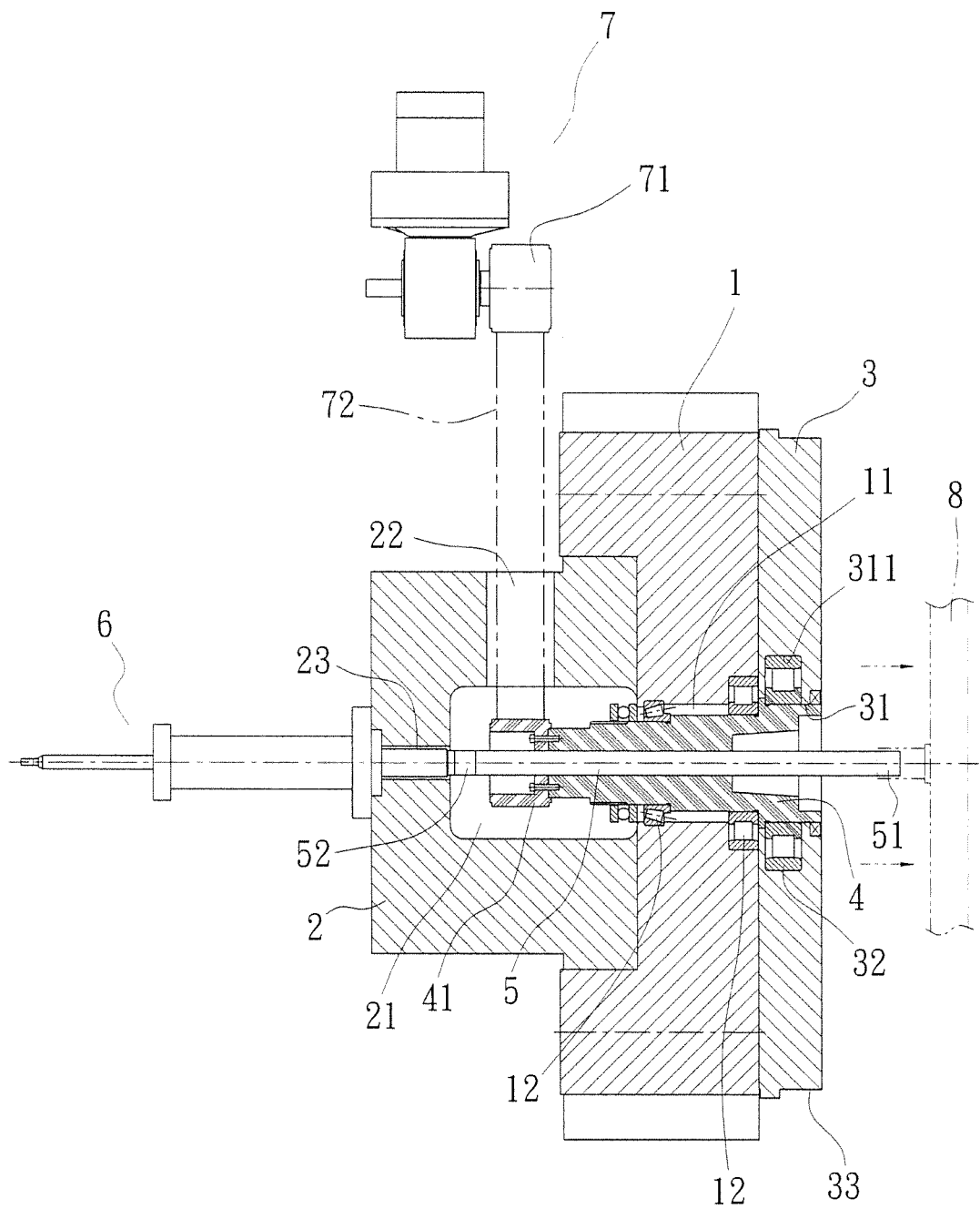
FIG. 3 is a schematic drawing showing a shaft moving forward for mold closing.
Figure 4:
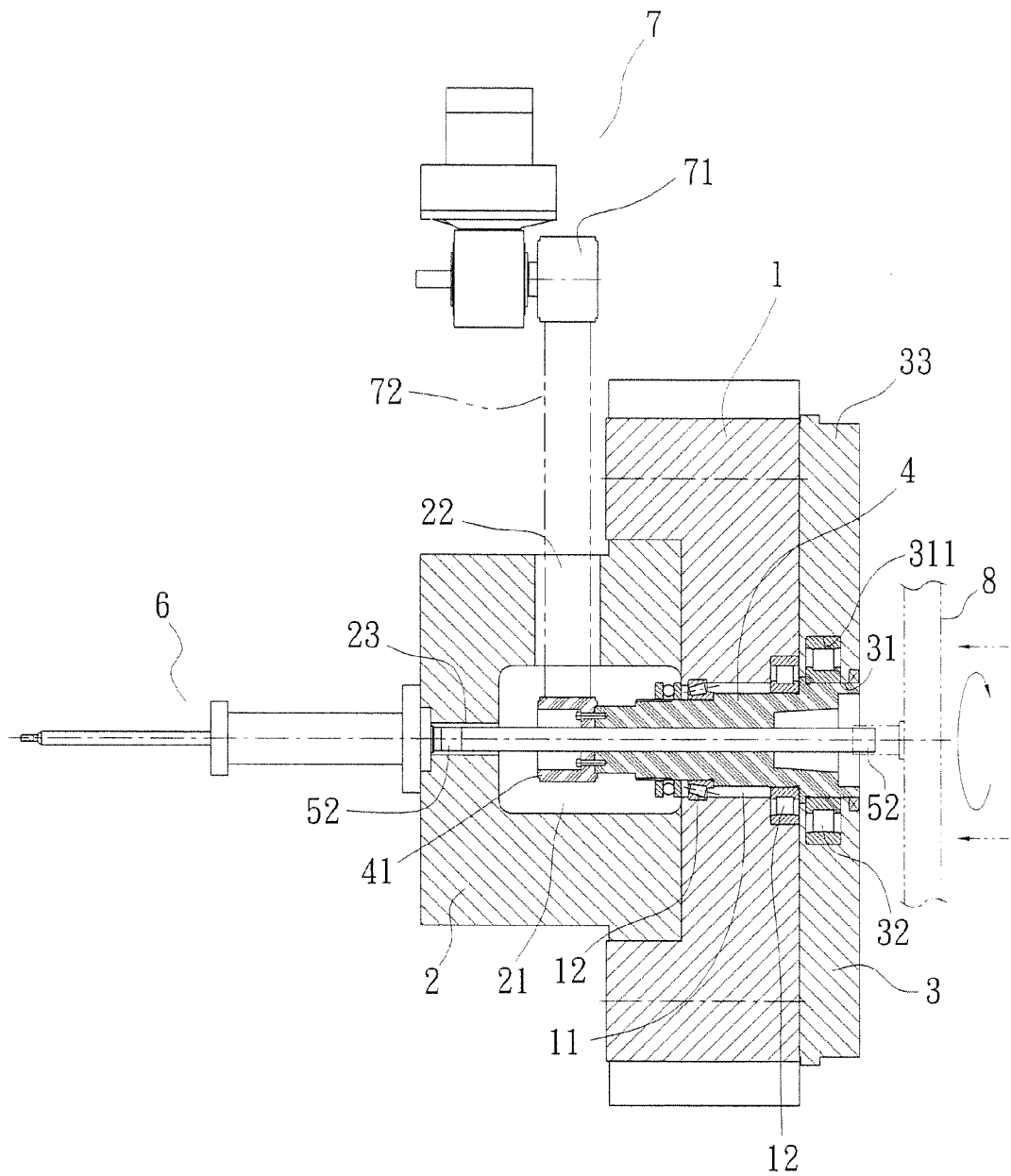
FIG. 4 is a schematic drawing showing a shaft moving backward and rotating of an embodiment according to the present invention.

Refer to FIG. 1 and FIG. 2, a double color Injection machine with a shaft and a disc of the present invention includes a main body 1, a base 2, a disc 3, a shaft sleeve 4, a shaft 5, a drive mechanism 6, and a servo motor 7.

The main body 1 is arranged with an axial hole 11 And a second bearing 12 is disposed on a front end and on a rear end of the axial hole 11 respectively for assisting in rotary action. The base 2 is connected to one end of the main body 1. The base 2 include a receiving slot 21 mounted therein, a through hole 22 and a mounting hole 23 both communicating with the receiving slot 21. The disc 3 consists of a slotted hole 31 with a bearing slot 311 on a center thereof, a first bearing 32 mounted in the bearing slot 311, and a plurality of tooth 33 arranged around a periphery thereof. The tooth 33 is engaged with a gearing 341 of an action motor 34 and the action motor 34 drives the disc 3 to rotate an angle. The shaft sleeve 4 is inserted through the axial hole 11 of the main body 1. One end of the shaft sleeve 4 is extended to the slotted hole 31 of the disc 3 to be assembled with and positioned by the first bearing 32 while the other end of the shaft sleeve 4 is mounted in the receiving slot 21 of the base 2 and is disposed with a toothed part 41. The shaft 5 is passed through and mounted in the shaft sleeve 4 and is disposed with a first connection part 51 and a second connection part 52 on two ends respectively. The first connection part 51 is corresponding and connected to a male mold 8. The drive mechanism 6 is assembled on the mounting hole 23 of the base 2 and is connected to the second connection part 52 of the shaft 5 correspondingly so as to drive the shaft 5 to move horizontally. The servo motor 7 includes a driving wheel 71 and a driving belt 72. By the driving belt 72 passed through the through hole 22 of the base 2, the driving wheel 71 is linked to and run simultaneously with to the toothed part 41 of the shaft sleeve 4.

Refer from FIG. 1 to FIG. 4, while manufacturing products with larger volume and large-scale molds are used, the disc 3 is used to be assembled with a male mold 8. The double-color injection is achieved by means of the disc 3. By the tooth 33 around the disc 3 engaged with the gearing 341 of the action motor 34, the disc 3 is driven to rotate an angle. When the action motor 34 drives the disc 3 to rotate, the disc 3 is assembled with the shaft sleeve 4 by the first bearing 32 mounted in the slotted hole 31 of the disc 3. Thus the shaft sleeve 4 and the shaft 5 will not be driven to rotate due to disposition of the first bearing 32 while the disc 3 rotating.

When the double color injection machine is used to produce small-size products, small molds are used. At this moment, use the shaft 5 to assembled with the male mold 8. The action motor 34 of the disc 3 is controlled to stop working once the shaft 5 is used in manufacturing. Then the first connection part 51 of the shaft 5 is connected to the male mold 8 and the drive mechanism 6 works to push the shaft 5 to move forward and make the male mold 8 come close to a female mold. After formation of the injected material (with first coloring agent), the drive mechanism 6 works again and drives the shaft 5 to move backward and make the male mold 8 release from the female mold and turn back to the original position. Now the servo motor 7 is turned on to drive the driving belt 72 through the driving wheel 71. Thus the toothed part 41 of the shaft sleeve 4 is driven and moved by the driving belt 72. Then the shaft sleeve 4 and the shaft 5 in the shaft sleeve 4 are rotated an angle. Next the drive mechanism 6 works again and pushes the shaft 5 to move forward and make the male mold 8 engage with the female mold for injection of material with the second coloring agent.

By design of the shaft sleeve 4 on the shaft 5 corresponding to the first bearing 32 of the disc 3, the shaft 5 is not rotated with the rotating disc 3 driven by a power. While the servo motor 7 drives the shaft 5 to rotate correspondingly, the disc 3 is not rotated. At the same time, the fast and precise positioning is achieved. Moreover, the servo motor 7 is further disposed with an encoder for more precise positioning.

In summary, a double color injection machine with a shaft and a disc according to the present invention has following advantages:

1. By the design of the shaft sleeve on the shaft corresponding to the first bearing of the disc, the shaft is not rotated with the rotating disc driven by a power. When the shaft is driven by the servo motor to rotate, the disc is not rotated. Compared with conventional techniques, the present invention minimizes friction and wear, reduces manufacturing cost, and improves assembly efficiency.
2. By the disposition of the servo motor that drives the shaft to rotate, together with the arrangement of the encoder, fast and precise positioning is attained.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A double color injection machine with a shaft and a disc comprising:
a main body disposed with an axial hole;
a base connected to one end of the main body and having a receiving slot therein, a through hole and a mounting hole both communicating with the receiving slot;
a disc having a slotted hole with a bearing slot on a center thereof, a first bearing mounted in the bearing slot, and a plurality of teeth arranged around a periphery thereof to be engaged with a gearing of an action motor; the action motor driving the disc to rotate relative to the base;
a shaft sleeve inserted through the axial hole of the main body and having one end extended to the slotted hole of the disc to be assembled with and positioned by the first bearing, and another end mounted in the receiving slot of the base, the shaft sleeve including a toothed part;
a shaft passed through and mounted in the shaft sleeve and having a first connection part and a second connection part, the first connection part corresponding to a male mold for selective connection thereto;
a drive mechanism assembled on the mounting hole of the base and connected to the second connection part of the shaft correspondingly so as to drive the shaft to move axially; and
a servo motor including a driving wheel and a driving belt linked to the toothed part of the shaft sleeve;

wherein the shaft and disc are each separately rotatable relative to the base for rotating a male mold selectively connected thereto.

2. The device as claimed in claim 1, further comprising a second bearing is disposed on a front end and a rear end of the axial hole of the main body.

3. The device as claimed in claim 1, wherein the servo motor is disposed with an encoder.

4. The device as claimed in claim 2, wherein the servo motor is disposed with an encoder.

* * * * *